Nov. 14, 1967  H. D. BROWN  3,352,291
ROTARY INTERNAL COMBUSTION ENGINE
Filed Nov. 17, 1965  3 Sheets-Sheet 1

Harry D. Brown
INVENTOR.

Nov. 14, 1967  H. D. BROWN  3,352,291
ROTARY INTERNAL COMBUSTION ENGINE
Filed Nov. 17, 1965  3 Sheets-Sheet 2

Harry D. Brown
INVENTOR.

BY *Clarence A. O'Brien*
*and Harvey B. Jacobson*
Attorneys

Nov. 14, 1967     H. D. BROWN     3,352,291
ROTARY INTERNAL COMBUSTION ENGINE
Filed Nov. 17, 1965     3 Sheets-Sheet 3
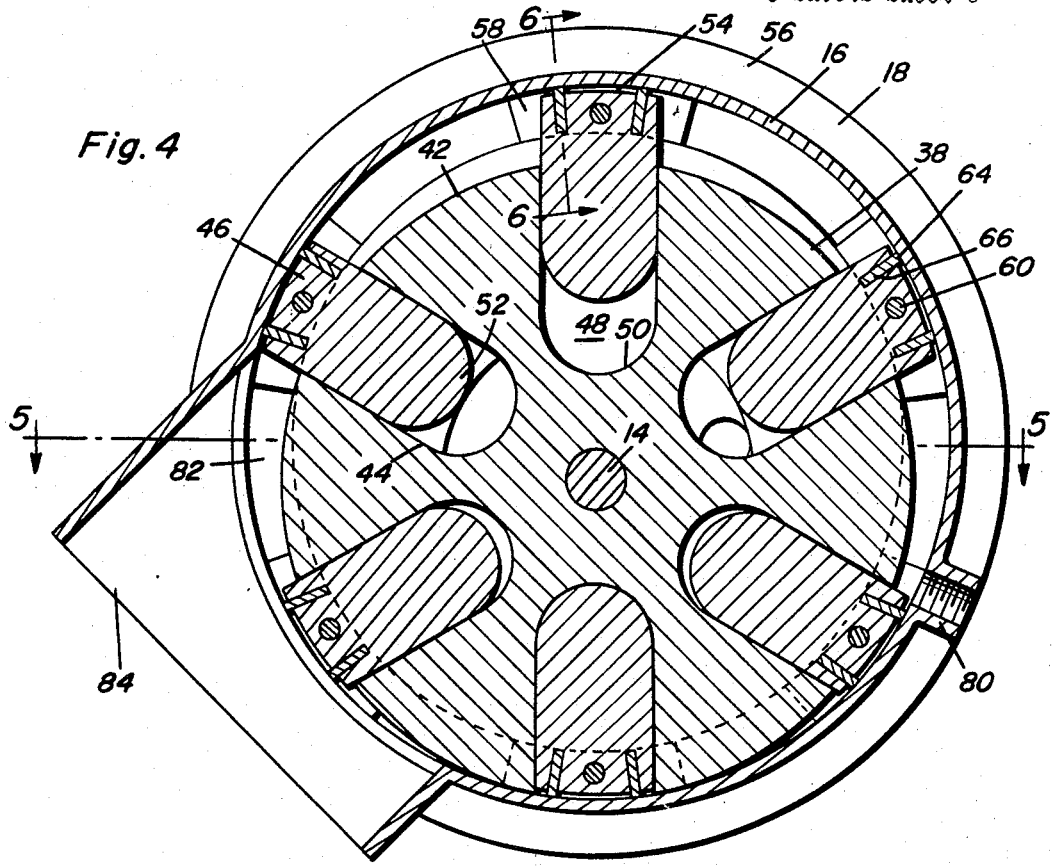
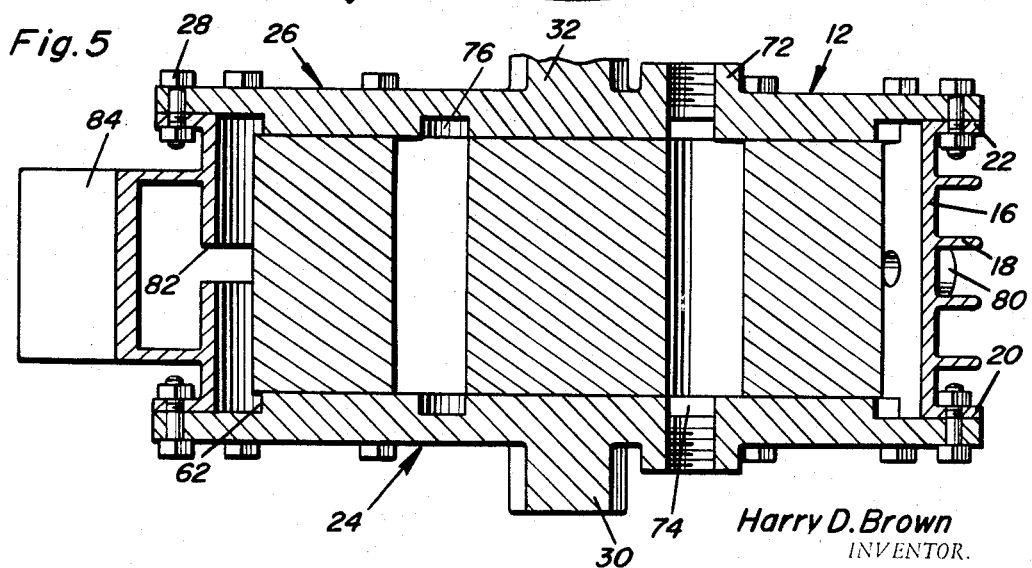
Harry D. Brown
INVENTOR.

United States Patent Office 3,352,291
Patented Nov. 14, 1967

3,352,291
ROTARY INTERNAL COMBUSTION ENGINE
Harry D. Brown, 2263 Broadway,
Grand Junction, Colo. 81501
Filed Nov. 17, 1965, Ser. No. 508,260
3 Claims. (Cl. 123—16)

This invention relates to internal combustion engines of the rotary type.

A primary object of the present invention is to provide a rotary type of internal combustion engine that does not require any valve actuating mechanism and associated timing systems. Thus, the internal combustion engine of the present invention is less costly to manufacture and smoother in operation.

An additional object of the present invention is to provide a rotary type of internal combustion engine wherein explosive impulses are produced within a peripheral chamber surrounding the radially outer portion of a rotor in order to obtain maximum torque. Further, a plurality of power strokes are produced during a single revolution of the rotor by combustion of charges of combustible fluid supplied to a radially inner portion of the rotor in order to efficiently operate the engine.

A still further object of the present invention is to provide a rotary type of internal combustion engine as aforementioned wherein the component parts do not undergo any irregular movements so that vibration is minimized.

In accordance with the foregoing objects, the engine of the present invention is endowed with a relatively high power to weight ratio and its arrangement of parts provides design flexibility in connection with volumetric displacement and torque. The principles of the present invention may therefore be applicable to a wide variety of installations including hand-powered tools as well as low powered and high powered vehicle installations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a sectional view taken substantially through a plane indicated by section line 4—4 in FIGURE 2.

FIGURE 5 is a sectional view taken substantially through a plane indicated by section line 5—5 of FIGURE 4.

Figure 1:
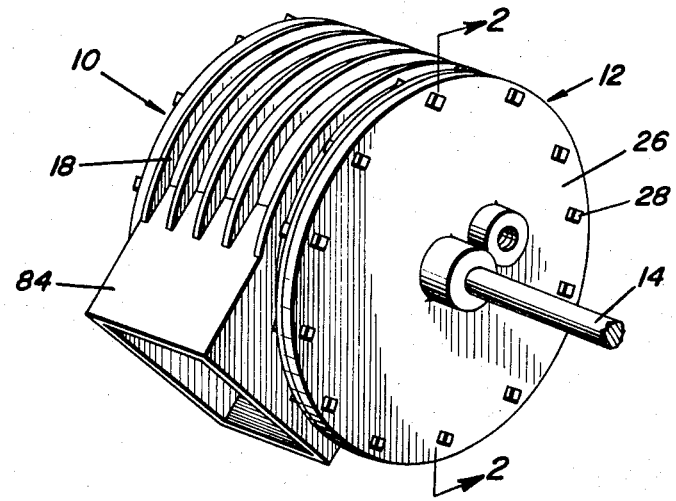
FIGURE 1 is a perspective view of one embodiment of an engine constructed in accordance with the principles of the present invention.

Referring now to the drawings in detail, FIGURE 1 illustrates one form of an air cooled engine constructed in accordance with the present invention, the engine being generally denoted by reference numeral 10. The operating parts of the engine are enclosed within a cylindrical housing 12 from which the engine shaft 14 extends. It will also be appreciated, that the engine will be associated with other equipment such as a fuel supply system, an ignition system and exhaust gas handling facilities which are not shown since the details thereof form no part of the present invention.

Figure 2:
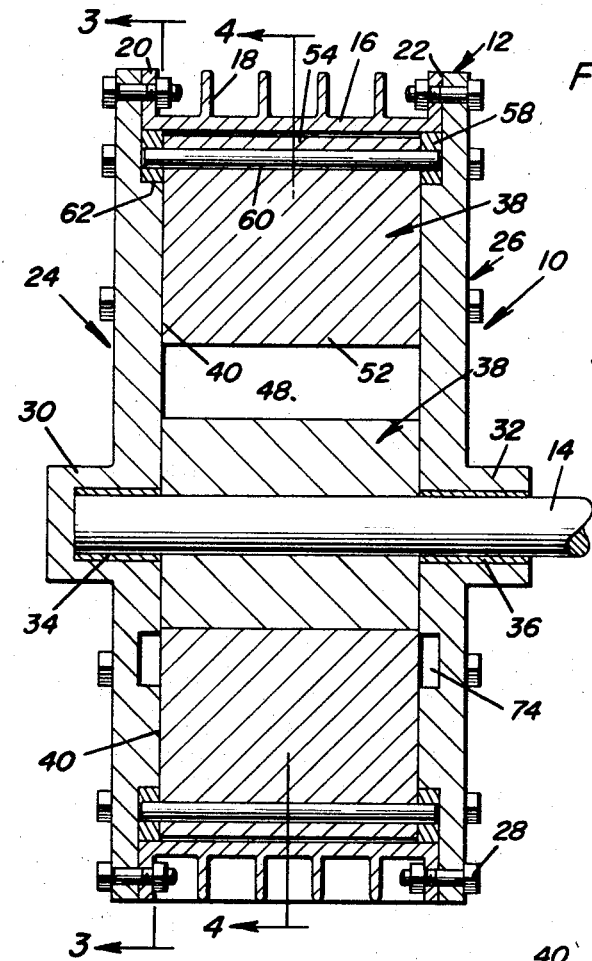
FIGURE 2 is an enlarged sectional view taken substantially through a plane indicated by section line 2—2 in FIGURE 1.

Referring now to FIGURES 2, 4 and 5 in particular, it will be observed that the housing 12 includes an annular portion 16 from which a plurality of axially spaced cooling fins 18 project radially. The annular portion 16 of the housing is provided with axially spaced flanges 20 and 22 respectively bolted to side wall members 24 and 26 by means of a plurality of circumferentially spaced fastener assemblies 28. The side wall members are generally circular in shape so as to enclose a cylindrical space within the annular portion 16 of the housing to which the side wall members are bolted. The engine shaft 14 extends through the cylindrical space and is journalled by the side wall members about an axis which is offset from the geometrical axis of the cylindrical space. Toward this end, the side wall members are respectively provided with eccentrically disposed projections 30 and 32 axially aligned with each other. The projection 30 is provided with a suitable bearing such as the sleeve bearing 34 to form a bearing socket for one end of the engine shaft, while the projection 32 mounts a bearing 36 for journalling the engine shaft in spaced relation to the bearing 34. A rotor 38 is secured to the engine shaft for rotation therewith and is disposed in eccentric relation to the cylindrical space enclosed by the housing. The rotor 38 is so dimensioned that the axial end faces 40 thereof form a sliding fit between the side wall members 24 and 26 while the radially outer surface 42 of the rotor is circular and substantially tangential to the internal surface of the annular housing portion 16 to form therewith a peripheral chamber of radially variable dimension as more clearly seen in FIGURE 4.

Figure 7:
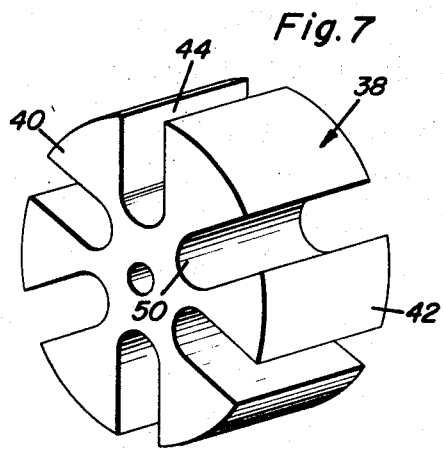
FIGURE 7 is a perspective view of the rotor associated with the engine of the present invention.

As more clearly seen in FIGURES 4 and 7, the rotor is provided with a plurality of radial slots 44 within which a plurality of piston members 46 are slidably mounted. The piston members are dimensioned so that they extend axially between the side faces of the rotor for sliding contact with the side wall members of the housing. The piston members are also dimensioned radially so that they may be withdrawn completely into the slot 44 as shown by the piston member in the lowermost phase position of FIGURE 4. Accordingly, a variable volume piston chamber 48 will be formed between the radially inner portion 50 of the slots 44 and the radially inner ends 52 of the piston members. The radially outer ends 54 of the piston members on the other hand, are maintained in constant, close spaced relation to the internal surface of the annular housing portion 16 so that the piston members will be reciprocable within their respective slots 44 in response to rotation of the rotor 38.

Figure 6:
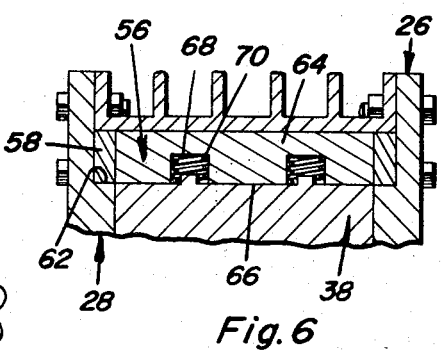
FIGURE 6 is a partial sectional view taken substantially through a plane indicated by section line 6—6 in FIGURE 4.

Referring now to FIGURES 2, 4 and 6, it will be observed that each of the piston members is provided with a fluid displacing bearing assembly generally referred to by reference numeral 56 which includes a pair of arcuate bearing blocks 58 pivotally mounted by the piston member adjacent the radially outer end 54 thereof and disposed on opposite axial sides of the piston member in sliding contact with the internal surface of the annular housing portion 16. A pivot shaft 60 is therefore mounted by force fit within a bore formed in the piston member adjacent the radial outer end 54, the pivot shaft projecting axially beyond opposite side faces 40 so as to pivotally support the bearing blocks 58 thereon. The bearing blocks in addition to being in sliding contact with the internal surface of the annular housing 16, are slidably received on circular bearing race surfaces 62 respectively formed on the side wall members 24 and 26 in concentric relation to the annular housing portion 16. Thus, the side wall members and the annular housing portion 16 form bearing races for the bearing blocks 58 which are eccentrically related to the rotational axis of the rotor 38 in order to constrain the piston members for reciprocatory movement relative to the rotor in response to rotation thereof about the axis of the engine shaft 14. The bearing blocks 58 in addition to constraining movement of the piston members, will separate the arcuate spaces on either side of each piston member within the annular bearing space formed within the annular races. Each piston member together with the associated bearing blocks 58 will therefore displace the fluid within the peripheral chamber formed between the outer surface 42 of the rotor and the internal surface of the annular housing portion 16. In order to seal the spaces on either side of each piston member from each other, each piston member is provided with a pair of radially projecting sealing members 64 received within slots 66 formed in the piston members. As more clearly seen in FIGURE 6, the sealing members 64 may be provided with slots 68 for seating springs 70 that bias the sealing members into wiping engagement with the internal surface of the annular housing portion 16.

Figure 3:
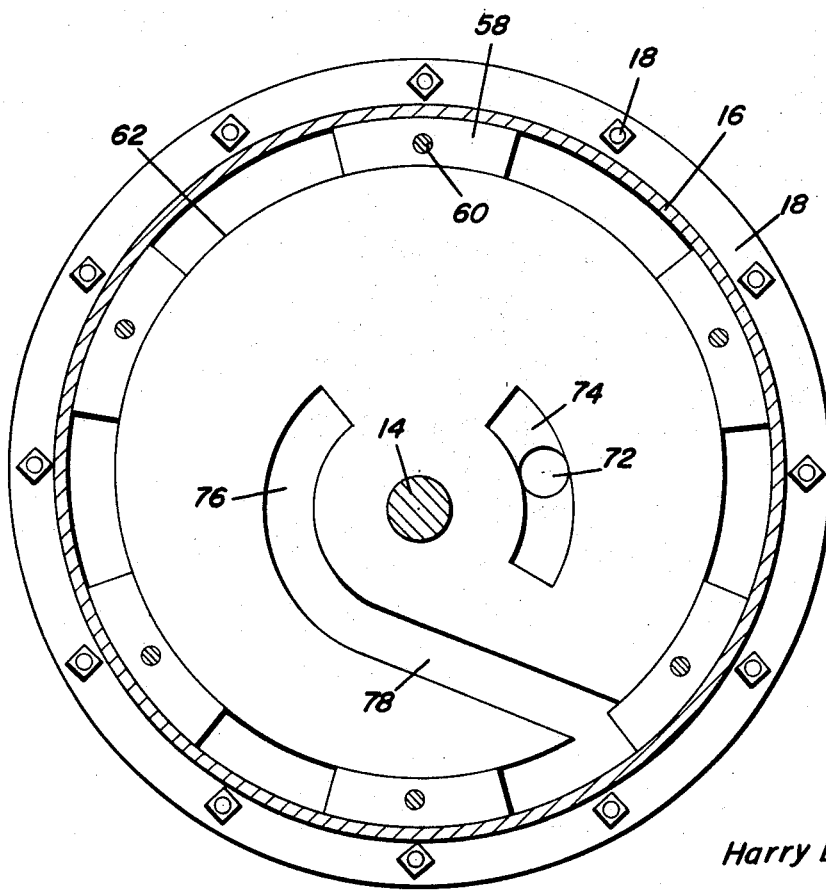
FIGURE 3 is a sectional view taken substantially through a plane indicated by section line 3—3 in FIGURE 2.
Figure 8:
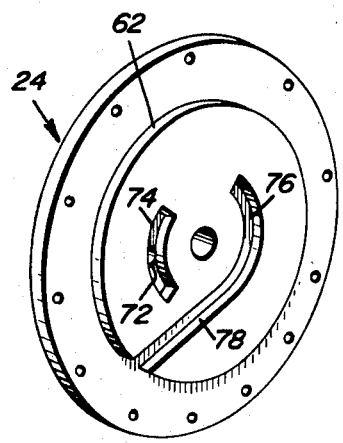
FIGURE 8 is a perspective view of one of the side walls associated with the housing of the engine.

Referring now to FIGURES 5 and 8 in particular, it will be observed that each of the side wall members includes an internally threaded fluid inlet port 72 to which fuel supply carburetors may be connected, in order to supply a charge of combustible fluid to the engine. The inlet ports 72 are aligned with arcuate passages 74 formed in the side wall members. The arcuate passages 74 have a center of curvature on the rotational axis of the rotor 38 or engine shaft 14 so that the passages 74 will be in communication with the radially inner end portions of the slots 44. The combustible fluid conducted to the engine through the inlet ports 72 will thereby be successively introduced into the piston chambers 48 as they are brought into communication with the passages 74 in response to rotation of the rotor. The side wall members also have formed therein arcuate passage portions 76 which are circumferentially spaced from the inlet passages 74 and are also arranged to communicate with the radially inner portions of the piston chambers 48 as the rotor is rotated about its rotational axis. The passage portions 76 are therefore radially disposed at the same distance from the rotational axis of the rotor as the inlet passages 74. However, fluid in passage portions 76 are transferred to the peripheral chamber. Toward this end, the side wall members are provided with connecting passage portions 78 which extend tangentially from the arcuate passage portions 76 to the bearing race surface 62 in order to conduct fluid to the spaces between the piston members within the annular bearing race as more clearly seen in FIGURE 3.

The annular housing portion 16 is provided with an internally threaded, radially projecting mounting portion 80 as more clearly seen in FIGURE 4 in order to removably mount a spark plug device (not shown) in communication with the peripheral chamber formed within the housing. Accordingly, the combustible fluid transferred to the peripheral chamber may be ignited so that the expanding gases formed by the ensuing explosion will exert a net force on the piston member in a counterclockwise direction about the rotational axis of the rotor as viewed in FIGURE 4. It will therefore be apparent, that successive charges of combustible fluid trapped between adjacent piston members within the peripheral chamber will be ignited by the spark plug so as to exert a plurality of explosive impulses during each revolution of the rotor. As the rotor rotates, the spaces within the peripheral chamber between adjacent piston members are successively brought into communiaction with an outlet slot 82 formed in the annular housing portion 16 to which the exhaust gas outlet formation 84 is connected. The outlet slot 82 is of a sufficient circumferential extent as to insure that the peripheral chamber spaces between the piston members are completely scavenged by the volumetric contraction of the peripheral chamber spaces.

From the foregoing description, the construction and utility of the internal combustion engine of the present invention will be apparent. It will therefore be appreciated, that rotation imparted to the rotor 38 will cause reciprocation of the piston members so that the piston chambers 48 while being volumetrically expanded, will be in communication with the arcuate inlet passage 74 in the side wall members in order to draw in a charge of combustible fluid. Once the charge of combustible fluid is sealed from the passages 74, it undergoes compression because of the volumetric contraction of the piston chamber by the radially inward displacement of the piston member. During the compression of the charge of combustible fluid within the piston chamber 48, it is brought into communication with the passage portions 76 so that continued radially inward displacement of the piston members will displace the combustible fluid through the connecting passage portions 78 into the radially outer spaces of the peripheral chamber between two adjacent piston members. The charge of combustible fluid is thereby brought into communication with the spark plug for ignition in order to produce an explosive impulse. The driving torque produced by such explosive impulses will of course be determined by the number of piston members associated with the rotor and the volume of the combustible charges being handled. Once combustion is completed, the combustion products are compressed within the peripheral chamber spaces and then completely discharged through the outlet slot 82, as the space between the piston members is substantially reduced to zero where the radially outer surface 42 of the rotor is in substantial tangential relation to the internal surface of the annular housing portion 16. Thus, the spaces between the piston members are completely scavenged by volumetric contraction thereof to a minimum volume after which there is a volumetric expansion of the spaces between the piston assemblies. While the spaces between the piston assemblies within the peripheral chamber are expanding, a new charge of combustible fluid is transferred thereto through the connecting passage portions 78 as aforementioned after which the charge is ignited before expansion of the spaces within the peripheral chamber is completed thereby producing forces in one rotational direction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an internal combustion engine, an annular housing having side walls, a rotor rotatably mounted in eccentric relation within said housing to form a peripheral chamber therein, said rotor having at least one radial slot communicating with said peripheral chamber at a radially outer end, a piston slidably mounted within said slot to form a piston chamber at a radially inner end of said slot, fluid displacing means operatively mounted by the piston in engagement with the housing for displacing the piston in response to rotation of the rotor, fluid inlet means mounted by at least one of said side walls in communication with said radially inner end of the slot for conducting a charge of combustible fluid into said piston chamber in response to volumetric expansion thereof, transfer passage means mounted by at least one of said side walls in circumferentially spaced relation to the fluid inlet means for transferring said charge of combustible fluid from the piston chamber during compression thereof to the fluid displacing means within the peripheral chamber, ignition means mounted by the housing in communication with said peripheral chamber for igniting the charge of combustible fluid during expansion thereof within the peripheral chamber, and exhaust means connected to the housing in spaced relation to the ignition means for communication with the peripheral chamber forwardly of the piston in the direction of rotation of the rotor while compressing products of combustion.

2. The combination of claim 1 wherein said fluid displacing means comprises, a pair of bearing blocks slidably mounted within annular races formed in said side walls, means pivotally connecting said bearing blocks to the radially outer end of the piston, and sealing means mounted by the piston between the bearing blocks in wiping engagement with the housing.

3. In an internal combustion engine, an annular housing having side walls, a rotor rotatably mounted in eccentric relation within said housing to form a peripheral chamber therein, said rotor having a plurality of radial slots, each of said side walls having an annular race, a pair of circumferentially spaced arcuate passages formed in said side walls communicating with said slots in the rotor and a transfer passage tangentially extending from one of the arcuate passages to the annular race, a piston slidably mounted within each of the slots to form piston chambers therein, bearing means slidably mounted within said annular races on the side walls and pivotally connected to each of said pistons for displacing fluid within said peripheral chamber and imparting reciprocating movement to the pistons in response to rotation of the rotor, a fluid inlet connected to the side walls in communication with the other of the arcuate passages, an exhaust outlet connected to the housing in communication with said peripheral chamber, and ignition means mounted by the housing for communication with the peripheral chamber circumferentially spaced from the outlet.

References Cited

UNITED STATES PATENTS

| | | | |
|---|---|---|---|
| 865,206 | 9/1907 | Ranck | 123—16 |
| 2,263,274 | 11/1941 | Pieper | 123—16 |
| 3,181,510 | 5/1965 | Hovey. | |

RALPH D. BLAKESLEE, *Primary Examiner.*